United States Patent

Sasakawa et al.

Patent Number: 5,283,094
Date of Patent: Feb. 1, 1994

[54] OPTICAL RECORDING MEDIUM

[75] Inventors: Tomoyoshi Sasakawa, Chiba; Nobuhisa Kitagawa, Yokohama; Tadashi Koike, Kamakura; Hiroyuki Hyakutake, Yokohama, all of Japan

[73] Assignee: Mitsui Toatsu Chemicals, Inc., Tokyo, Japan

[21] Appl. No.: 873,958

[22] Filed: Apr. 27, 1992

[30] Foreign Application Priority Data

Apr. 26, 1991 [JP] Japan ................................. 3-96615

[51] Int. Cl.$^5$ .............................................. B32B 3/00
[52] U.S. Cl. ........................................ 428/64; 428/65; 428/457; 428/913; 430/945; 346/76 L; 346/135.1; 369/288
[58] Field of Search .................... 428/64, 65, 457, 913; 430/945; 346/76 L, 135.1; 369/288

[56] References Cited

U.S. PATENT DOCUMENTS 4,241,355 12/1980 Bloom et al. .................... 346/135

FOREIGN PATENT DOCUMENTS 0232964 8/1987 European Pat. Off. ............ 428/64
0381210 8/1990 European Pat. Off. .
0410879 1/1991 European Pat. Off. .

Primary Examiner—Patrick J. Ryan
Assistant Examiner—Elizabeth Evans
Attorney, Agent, or Firm—Millen, White, Zelano & Branigan

[57] ABSTRACT

An optical recording medium of a single plate type comprises a substrate, a recording layer overlying the substrate, a reflective layer overlying the recording layer, and a protective layer overlying the reflective layer, the recording layer being produced by coating a nonpolar solvent-soluble substituted phthalocyanine dye in a nonpolar solvent and the nonpolar solvent content of in the recording layer being 5% by weight or less.

14 Claims, No Drawings

OPTICAL RECORDING MEDIUM

BACKGROUND OF THE INVENTION

1. Field of the Invention

The present invention relates to an optical recording medium, and more particularly, to an optical recording medium of a single plate type, capable of recording a large volume of information and playable by commercially available compact disc players, which comprises a recording layer containing a dye, a reflective layer overlying the recording layer, and a protective layer overlying the reflective layer.

2. Description of the Related Art

As an information-oriented society has recently developed rapidly, optical recording mediums have been widely utilized and researched which can make a remarkably high density recording as compared with magnetic recording mediums.

As optical recording mediums, there are known a read-only-medium in which information has been recorded in advance and only reproduction is possible, a writable medium in which information can be recorded by users and reproduced, and a rewritable medium in which information can be recorded therein and the information thus recorded can be reproduced or erased.

Among them, the writable medium is generally inexpensive and excellent in durability as compared with the rewritable medium. Therefore, the writable medium has been widely used as a medium for storing a large volume of data.

The optically writable medium may have a metal layer of Te, Bi or the like or a dye layer of cyanine dyes, phthalocyanine dyes or the like as a recording layer on a substrate.

Information can be recorded in the recording layer by irradiating a laser beam to cause a physical or chemical change (pits formation) in the layer.

The pits are read out with a laser beam which is sufficiently weaker than that used for recording and thereby the information can be reproduced.

Among the optically writable mediums, there have recently been developed and spread some mediums capable of reading out by commercially available compact disc (CD) players.

The writable mediums which can be reproduced by CD players are proposed in Optical Data Storage 1989 Technical Digest Series Vol. 1, 45 (1989), EP-353393 and the like. The mediums are of a single plate type comprising a recording layer composed of an organic dye, a metal reflective layer and a protective layer. However, because a cyanine dye is used in the recording layer, there are problems as to poor light resistance and poor heat and humidity resistance.

Further, EP-0373643 discloses a writable medium reproducible by CD players and having a recording layer composed of a phthalocyanine dye. When a phthalocyanine dye, in particular, a phthalocyanine dye soluble in a nonpolar solvent is used in a recording layer, the resulting medium is excellent in light resistance and heat and humidity resistance, but there are some drawbacks that under certain conditions good written (recording) signal characteristics are not obtained, when a great number of sheets of each individual medium has a very small difference in recording signal characteristics; and the recording sensitivity of the medium is low.

For forming a recording layer containing a dye of the above-mentioned medium, there is usually used a method for coating with an organic dye solution. In particular, a spin-coating method is generally used from the standpoints of easy film formation and economy.

However, there have been hardly any investigation of the amount of a solvent remaining in a recording layer and the drying conditions after forming the recording layer when the recording layer is formed by a coating method.

Japanese Patent Application Laid-open No. Hei 2-16083 discloses that a solvated dye is used for a recording layer. And a dye solvated with 0.01-5% by weight of a polar solvent is preferable from the standpoints of jitter and error rate. However, the medium is not provided with a reflective layer and a protective layer formed on a dye recording film, and the medium concerns a cyanine type dye and a polar solvent. This Japanese Patent Application does not disclose a medium comprising a recording layer composed of a nonpolar solvent-soluble phthalocyanine dye, and a reflective layer and a protective layer formed successively on the recording layer.

The present inventors have intensively conducted research to solve the above-mentioned problems of a writable medium capable of read out by a commercial CD player which comprises a recording layer containing a nonpolar solvent-soluble phthalocyanine dye, and a reflective layer and a protective layer successively formed on the recording layer. As a result, it has been found that the amount of a solvent remaining in the recording layer of the medium has a considerable effect on the above-mentioned problems, and the drying conditions after forming the recording layer is very important. Thus the present invention has been completed.

SUMMARY OF THE INVENTION

An object of the present invention is to provide an optical recording medium having an improved recording sensitivity.

Another object of the present invention is to provide an optical recording medium of an improved recording signal characteristics such as jitter.

A further object of the present invention is to provide an optical recording medium in which each individual medium has a very small variance in quality even when a great number of sheets of the optical recording medium are produced.

According to the present invention, there is provided an optical recording medium of a single plate type which comprises a substrate, a recording layer overlying the substrate, a reflective layer overlying the recording layer, and a protective layer overlying the reflective layer, the recording layer being produced by coating a nonpolar solvent-soluble substituted phthalocyanine dye in a nonpolar solvent, and the nonpolar solvent content of the recording layer being 5% by weight or less.

DESCRIPTION OF THE PREFERRED EMBODIMENTS

The structure of the optical recording medium of the present invention may be fundamentally such that a recording layer capable of forming a pit by absorbing a laser beam is provided on a transparent substrate which, if desired, has a pregroove (guide groove), and a reflective layer is provided on the recording layer so as to enhance the reflectivity and furthermore a protective layer is formed on the reflective layer in order to protect the recording layer and the reflective layer.

As a material for the substrate, there may be mentioned any material capable of transmitting substantially a semiconductor laser beam and usable for ordinary optical recording mediums.

Exemplary suitable materials for the substrate include polymers such as polycarbonate resins, acrylic resins, polystyrene resins, polyvinyl chloride resins, epoxy resins, polyester resins, amorphous polyolefin resins and the like, and inorganic materials such as glass and the like.

If necessary, these materials are formed into a substrate having a pregroove by means of injection molding or by a method using a photopolymer.

As the dye used for the recording layer of the present invention, nonpolar solvent-soluble substituted phthalocyanine dyes are preferable from the standpoints of matching with an oscillatory wavelength of semiconductor laser and light resistance and humidity and heat resistance.

As the nonpolar solvent-soluble substituted phthalocyanine dye used in the present invention, there may be mentioned, for example,
  alkyl substituted phthalocyanine,
  alkoxy substituted phthalocyanine,
  alkylthio substituted phthalocyanine,
  trialkylsilyl substituted phthalocyanine,
  halogenated phthalocyanine derived from the above-mentioned substituted phthalocyanine,
and
the like.

Among them, alkoxy substituted phthalocyanine, alkylthio substituted phthalocyanine and halogenated phthalocyanine derived from these substituted phthalocyanines are preferable.

More particular substituted phthalocyanine dyes as described in the above-mentioned EP-0337209 and EP-0373643 are preferable which are incorporated by reference.

The substituted phthalocyanine dyes may be used alone or in combination.

The nonpolar solvent, in particular, nonpolar organic solvent used for dissolving the above-mentioned dyes in the present invention is not limited. In short, any nonpolar solvent may be used as far as it can dissolve the dye to be used and does not cause a damage to the substrate when applied thereto.

As a substrate, there is usually used polycarbonate resin substrate, acrylic resin substrate and the like. Taking this fact into consideration, a nonpolar organic solvent having solubility parameter of less than 8.5 is preferable.

When an organic solvent having a solubility parameter of 8.5 or more is used, in general, the recording position can not be sufficiently controlled, and the error rate of recording signal is bad.

Such drawbacks appear to be attributable to some damages formed at grooves of the substrate while coating.

Solubility parameter mentioned in connection with the present invention is defined as follows:

$$\delta = \{(\Delta H - RT)/V^L\}^{\frac{1}{2}}$$

where $\delta$ is a solubility parameter, $\Delta H$ is a heat of vaporization, and $V^L$ is a molar volume. $\Delta H$ can be calculated by Hildebrand rule using a boiling point, and it is obtained by the following formula:

$$\Delta H_{298} = 23.7 Tb + 0.020 Tb^2 - 2950$$

where Tb is a boiling point. Therefore, the solubility parameter is the value at 298° K.

Examples of solubility parameter as determined by Hildebrand rule are partly described in detail, for example, in "Yozai Handbook"(Solvent Handbook), pages 62–63, edited by Teruzo Asahara, published by Kohdan Sha.

Calculation of solubility parameter by Hildebrand rule is described in J. H. Hildebrand, "Solubility of Nonelectrolytes", 424–427 (1950), Reinhold Publishing Co.

Examples of organic solvents having a solubility parameter of less than 8.5 used in the present invention include:
  saturated aliphatic hydrocarbons such as
  pentane,
  n-hexane,
  isohexane,
  3-methylpentane,
  neohexane,
  2,3-dimethylbutane,
  n-heptane,
  2-methylhexane,
  3-methylhexane,
  3-ethylpentane,
  2,2-dimethylpentane,
  2,3-dimethylpentane,
  2,4-dimethylpentane,
  3,3-dimethylpentane,
  2,2,3-trimethylbutane,
  n-octane,
  isooctane,
  other isomers of octane,
  nonane,
  isomers of nonane,
  decane,
  isomers of decane,
  undecane,
  dodecane, and the like;
  unsaturated aliphatic hydrocarbons such as
  pentene,
  hexene,
  isomers of hexene,
  hexadiene,
  isomers of hexadiene,
  hexatriene,
  heptene,
  isomers of heptene,
  heptadiene,
  isomers of heptadiene,
  hepatriene,
  octene,
  isomers of octene,
  octadiene,
  octatriene,
  nonene,
  nonadiene,
  nonatriene,
  decene,
  undecene,
  dodecene,
  and the like;
  saturated alicyclic hydrocarbons such as cyclopentane,
methylcyclopentane,
dimethylcyclopentane,
ethylcyclopentane,
cyclohexane,
methylcyclohexane,
dimethylcyclohexane,
ethylcyclohexane,
isopropylcyclohexane,
cycloheptane,
cyclooctane,
and the like;
unsaturated alicyclic hydrocarbons such as
cyclopentene,
cyclopentadiene,
cyclohexene,
methylcyclohexene,
dimethylcyclohexene,
ethylcyclohexene,
cyclohexadiene,
methylcyclohexadiene,
cycloheptene,
and the like;
terpene type hydrocarbons;
linear ethers such as
diethyl ether,
dipropyl ether,
diisopropyl ether,
dibutyl ether,
diisobutyl ether,
dipentyl ether,
and the like;
trichlorotrifluoroethane,
propyl chloride,
and the like.

Among them, the above-mentioned saturated aliphatic hydrocarbons, unsaturated aliphatic hydrocarbons, saturated alicyclic hydrocarbons, unsaturated alicyclic hydrocarbons and linear ethers are preferable. In particular, among these solvents, those having a boiling point of 180° C. or less are more preferable since those serve to form easily a recording layer. These solvents may be used alone or in combination.

According to the present invention, solvents having a solubility parameter of 8.5 or more may be used in combination with solvents having solubility parameter of less than 8.5.

For example, there may be used mixtures of the above-mentioned solvents having a solubility parameter of less than 8.5 and the following solvents having a solubility parameter of 8.5 or more:

aromatic hydrocarbons such as
benzene,
toluene,
xylene,
ethylbenzene,
and the like;
ester type solvents such as
ethyl acetate,
butyl acetate,
amyl acetate,
ethylene glycol monoethyl ether acetate,
and the like;
ketone type solvents such as
acetone,
methyl ethyl ketone,
methyl isobutyl ketone,
cyclohexanone,
isophorone,
and the like;
alcohol type solvents such as
ethyl alcohol,
propyl alcohol,
butyl alcohol,
amyl alcohol,
ethylene glycol monomethyl ether,
ethylene glycol monobutyl ether,
benzyl alcohol,
and the like;
chloroform,
carbon tetrachloride,
methylene chloride,
methyl chloroform,
trichlene,
tetrachloroethylene,
dichloroethylene,
dichloroethane,
tetrachloroethane,
tetrahydrofuran,
dioxane,
diglyme,
dimethyl formamide,
and the like.

Naturally, in the above-mentioned case, the solubility parameter of the resulting mixture solvent is to be controlled to a value of less than 8.5 by adjusting the ratio of the components of the mixture.

When a mixture of solvents is used in the present invention, the solubility parameter of the mixture may be defined by the sum of products each of which is obtained by multiplying the volume fraction of a solvent by the solubility parameter of the solvent. That is, the value of solubility parameter ($\delta$) can be calculated by the formula (1), $$\delta = V_1\delta_1 + V_2\delta_2 + V_3\delta_3 + \cdots + V_n\delta_n \quad (1)$$

where $V_1$, $V_2$, $V_3$—$V_n$ are respective volume fractions of solvents in the mixture solvent, and $\delta_1$, $\delta_2$, $\delta_3$,—$\delta_n$ are respective solubility parameters of solvents in the mixture solvent.

The concentration of the above-mentioned dye solution in the present invention is usually 0.1-10% by weight, preferably 0.5-7% by weight although it varies depending on types of solvent and methods for forming the recording film.

At this point, to the extent as the effect of the present invention is not adversely affected, there may be added, for example, known aromatic or unsaturated aliphatic diamine type metal complexes, aromatic or unsaturated aliphatic diol type metal complexes, polymethine dyes, squarylium dyes, naphthoquinone type dyes, anthraquinone dyes or the like in an amount of preferably 30% by weight or less, more preferably 20% by weight or less.

When these dyes are added, a solvent should be selected which can dissolve both the above-mentioned dye and the nonpolar solvent-soluble substituted phthalocyanine dye of the present invention.

According to the present invention, for purposes of enhancing smoothness when forming a recording layer or diminishing therein defects such as pinhole and the like, there may be added to a solution of a substituted phthalocyanine dye of the present invention or, if necessary, a solution of a substituted phthalocyanine dye and the above-mentioned dye the following soluble resin such as nitrocellulose,
ethyl cellulose,
acrylic resins,
polystyrene,
vinyl chloride-vinyl acetate copolymer,
polyvinyl acetate,
polyvinyl butyral,
polyester resins,
and the like,
and additives such as leveling agents, deforming agents and the like.

However, when unnecessarily large amounts of the resin and the additive are added, reflectivity of the recording layer is lowered and recording sensitivity becomes poor.

In view of such fact as above, the amount of the resin and the additive is usually less than 20% by weight, preferably 10% by weight or less, more preferably 5% by weight or less.

In other words, the total amount of the substituted phthalocyanine dye and the above-mentioned dye capable of being used together with the substituted phthalocyanine dye in the recording layer is usually at least 80% by weight, preferably 90–100% by weight, more preferably 95–100% by weight.

The above-mentioned components are formed into a uniform layer on the above-mentioned substrate to form a recording layer. Upon forming the recording layer, the thickness of the recording layer is adjusted to obtain sufficient reflectivity after forming a reflective layer.

In the present invention, the recording layer may be produced by a coating method such as spin coating, dip coating, bar coating and the like. Among them, spin coating is generally used. That is, a substituted phthalocyanine dye is used as a main component and dissolved in a nonpolar solvent to prepare a coating solution, and the coating solution is applied to the above-mentioned substrate and then dried to produce a recording layer.

According to the present invention, the amount of the solvent remaining in the recording layer of the medium is 5% by weight or less. In the case where the amount of the remaining solvent exceeds 5% by weight, sufficient recording signal characteristics are not obtained, in particular, when a great number of sheets of the medium, for example, 100 sheets or more, or 1000 sheets or more, are produced, each individual medium has a very small difference in the recording signal characteristics, that is, the characteristics can not be stably obtained, and furthermore, the recording sensitivity becomes poor. The lower limit of the concentration is not particularly critical. However, from the standpoint of producivity, the concentration is preferably 0.05% by weight or more.

The concentration of the remaining solvent may be made 5% by weight or less by forming the recording layer and then drying it. The temperature for drying may be room temperature or an elevated temperature higher than room temperature.

The drying time and drying temperature are preferably such that $T \times t^{\frac{1}{2}}$ (T: temperature, °C. and t: time, hour) is preferably 50 or more, more preferably 100 or more. The upper limit of $T \times t^{\frac{1}{2}}$ is not particularly determined, but from the standpoint of the productivity, $T \times t^{\frac{1}{2}}$ is preferably 300 or less.

Further, the drying temperature is 50° C. or more, preferably 60° C. or more, in view of the productivity of the medium and stability of the recording characteristics.

The drying temperature is preferably 100° C. or lower taking the heat resistance of the substrate into consideration.

When the recording layer is dried at a temperature of 50° C. or higher, the stress remaining in the substrate and, the recording layer appears to be relaxed and therefore, the better results of the present invention are exhibited more dramatically.

The drying time usually from about 15 minutes to 25 hours and the pressure may be atmospheric pressure or reduced pressure.

The recording sensitivity in the present invention means the optimum recording power. When an FEM (eight-fourteen modulation) signal is recorded, then read out, and the upper end and the lower end of the amplitude of the AC coupled HF signal thus read out are designated by $A_1$ and $A_2$, respectively, the recording sensitivity is the recording power at $\beta = 0.04$ where $\beta = (A_1 - A_2)/(A_1 + A_2)$.

In general, the recording sensitivity is related to the speed of formation of pits. For example, when the solvent remains in the recording layer, the melting temperature of the dye is lowered and the heat decomposition temperature is lowered, the recording sensitivity becomes good.

However, according to the definition of "recording sensitivity" of the present invention, the recording sensitivity varies, depending on the manner of formation of 9 kinds of pits, in particular, formation of the longest pit and the shortest pit. Therefore, lowering of the melting temperature and lowering of the decomposition temperature of the dye do not always result in improving the recording sensitivity.

To measure the amount of the remaining solvent of the medium, the reflective layer and protective layer are removed and the remaining solvent in the recording layer is extracted with another solvent or evaporated out by heating in a closed system and then, the amount of it is measured by gas chromatography.

Further, the amount of the remaining solvent may be determined by measuring the weight loss of the recording layer, or by measuring the absorbance ratio of the solvent in the layer by infrared spectroscopy.

According to the present invention, an undercoating layer of various types may be formed between the recording layer and the substrate so as to improve resistance to a coating solvent and thus prevent the deterioration of the recording layer.

Examplary suitable materials for the undercoating layer include high polymers such as polycarbonate, poly (methyl methacrylate), polystyrene and the like, and inorganic substances such as $SiO_2$, $SnO_2$, $Al_2O_3$, AlN and the like. These may be used alone or in combination. In addition, the undercoating layer may have a multi-layer structure composed of two or more layers.

According to the present invention, after the formation of the recording layer, a reflective layer is formed on said recording layer.

As the reflective layer, there is used, for example, a thin film of a metal such as Au, Ag, Al, Pt, Cu and the like, or a thin film of an oxide of such metals as above. The metal may be an alloy containing one or more of these metals.

Further, in addition to the above-mentioned metals, other metals such as Cr, Ni, Si, Ge, Pb, Pd, Sn, Sb and the like may be used as auxiliary component.

For forming the reflective layer, there may be usually used vacuum vapor deposition, sputtering, ion plating and the like. The thickness of the reflective layer is usually about 20-200 nm.

For the purpose of improving reflectivity or adhesion between the recording layer and the reflective layer, there may be provided an intermediate layer between the recording layer and the reflective layer.

Exemplary suitable materials for the intermediate layer include high polymers such as polycarbonate, poly (methyl methacrylate), polystyrene and the like; inorganic substances such as $SiO_2$, $SnO_2$, $Al_2O_3$, AlN and the like; and silane coupling agents and the like.

These materials may be used alone or in combination. The intermediate layer may have a multi-layer structure composed of two or more layers.

According to the present invention, a protective layer is formed on the above-mentioned reflective layer. The protective layer may be any kind of protective layer which protects the recording layer and the reflective layer. For example, the protective layer may be composed of a high polymer material such as polycarbonate, acrylic resins, polystyrene, polyvinyl chloride, epoxy resins, polyester and the like; and inorganic substances such as $SiO_2$, $Al_2O_3$, AlN and the like.

Among them, an ultraviolet light-curable acrylic resin or expoxy resin is preferable since it can be easily formed into a protective layer.

These materials may be used alone or in combination. Further, the protective layer may have a multi-layer structure composed of two or more layers. The thickness of the protective layer is usually about 2-20 μm. Printing may be made on the protective layer of the optical recording medium of the present invention.

According to the present invention, the optical recording medium exhibits an improved recording sensitivity and improved recording signal characteristics such as jitter and the like.

The present invention is illustrated in detail in the following examples which are embodiments of the present invention, which should not be construed as limited by the examples.

EXAMPLE 1

A 2 weight % solution of a brominated (average 4.2 bromine atoms per molecule) Pd-tetra-(1,2-dimethylpropoxy)phthalocyanine dye in n-hexane was dropped onto an injection molded polycarbonate resin substrate having a groove (120 nm in depth, 0.5 μm in width, 1.6 μm in pitch) in a spiral form of 1.2 mm thick and 120 mm in diameter. Then the resin substrate was rotated at a speed of 1100 rpm for 20 sec.

Under the same conditions as above, a coated substrate was prepared and the solvent content in the dye of the coated substrate was quantitatively analyzed and it was found that the solvent content was 10% by weight. The analysis was effected by peeling off the dye, dissolving the dye thus peeled in toluene and then effecting gas chromatography.

The above-mentioned coated substrate was dried with a stream of hot air at 80° C. for 10 hours ($T \times t^{\frac{1}{2}} = 253$) to form a recording layer.

A thin gold film of 120 nm thick was formed on the recording layer as a reflective layer by sputtering and then an ultraviolet light cured resin layer of 3 μm thick was formed as a protective layer to produce a medium.

The protective layer and the reflective layer were peeled off and the amount of the solvent remaining in the recording layer was measured by chromatography. It was 1.2% by weight.

EFM modulation signals were recorded on the resulting optical recording medium by means of an optical recording apparatus with an optical head carrying a semiconductor laser having an oscillatory wavelength of 780 nm at linear speed of 1.4 m/sec with a variable recording laser power, and an optimum recording power (recording sensitivity) was determined.

Further, according to the same method as above, 100 sheets of the medium were produced, and signals were similarly recorded on the sheets of the medium. Then the recorded signals were read out at a laser output of 1 mW, and average values of jitter and the standard deviation of the 100 sheets were determined.

Table 1 shows the result.

EXAMPLE 2

The procedure of Example 1 was repeated except that dimethylcyclohexane was used in place of n-hexane and drying was carried out at 25° C. for two days ($T \times t^{\frac{1}{2}}) = 173$, and the resulting optical recording medium was evaluated.

The result is shown in Table 1. The solvent remained in an amount of 12% by weight in the recording layer before drying, but after forming the protective layer, the solvent decreased to 3% by weight.

EXAMPLE 3

The procedure of Example 1 was repeated except that a mixture solvent of 95% by weight of methylcyclohexane and 5% by weight of dioxane (the Sp value is still less than 8.5 and it can be regarded as a nonpolar solvent) was used in place of n-hexane and vacuum drying was conducted at 60° C. for 5 hours ($T \times t^{\frac{1}{2}} = 134$), and the resulting optical recording medium was evaluated.

Table 1 shows the result. Further, before drying, 15% by weight of the solvent remained in the recording layer, but after forming a protective layer, it decreased to 1.5% by weight.

COMPARATIVE EXAMPLE 1

The procedure of Example 1 was repeated except that the reflective layer and the protective layer were formed immediately after forming the recording layer by coating without drying, and a medium was produced. The concentration of the solvent remaining in the recording layer of the medium was 7% by weight.

The evaluation of the medium was made in a manner similar to Example 1. Table 1 shows the result. This shows that when the concentration of the solvent remaining in the recording layer exceeds 5% by weight, the purpose of the present invention can not be attained.

COMPARATIVE EXAMPLE 2

The procedure of Example 2 was repeated except that, after the recording layer was formed, the drying was effected under the conditions of 25° C. and 2 hours ($T \times t^{\frac{1}{2}} = 35$) and then the reflective layer and the protective layer were formed, and a medium was produced.

The concentration of the solvent remaining in the recording layer was 6.5% by weight. The evaluation was effected in a manner similar to Example 1. The result is shown in Table 1.

COMPARATIVE EXAMPLE 3

The procedure of Example 3 was repeated except that, after the recording layer was formed, drying was effected at 60° C. for 30 min. ($T \times t^{\frac{1}{2}} = 42$) and then the reflective layer and the protective layer were formed, and a medium was produced.

The concentration of the solvent remaining in the recording layer of the medium was 5.5% by weight. The evaluation was conducted in a manner similar to Example 1. The result is shown in Table 1.

TABLE 1

| No. | Optimum Recording Power (mW) | Jitter (ns) | |
|---|---|---|---|
| | | Average | Standard deviation |
| Example 1 | 6.8 | 18 | 2 |
| Example 2 | 7.0 | 22 | 3 |
| Example 3 | 6.5 | 16 | 2 |
| Comparative Example 1 | 8.5 | 43 | 15 |
| Comparative Example 2 | 8.2 | 39 | 12 |
| Comparative Example 3 | 7.8 | 35 | 8 |

What is claimed is:

1. An optical recording medium of a single plate type which comprises a substrate, a recording layer overlying the substrate, a reflective layer overlying the recording layer, and a protective layer overlying the reflective layer, the recording layer being produced by coating the substrate with a nonpolar solvent-soluble substituted phthalocyanine dye in a nonpolar solvent whose solubility parameter is less than 8.5 and the nonpolar solvent content of the recording layer is 5% by weight or less wherein the recording layer is dried under the conditions of (temperature, C.)×(time, hour) being 50 or more before the reflective layer and the protective layer are formed.

2. The optical recording medium according to claim 1 in which the drying temperature is 50°–100° C.

3. The optical recording medium according to claim 1 in which the drying is effected under the conditions of (temperature, ° C.)×(time, hour) $\frac{1}{2}$ being 100 or more.

4. The optical recording medium according to claim 1 in which the solvent is a saturated or unsaturated aliphatic or alicyclic hydrocarbon or a linear ether and has a boiling point of 180° C. or less.

5. The optical recording medium according to claim 1 in which the recording layer has a solvent content of at least 0.05% by weight.

6. The optical recording medium according to claim 1 in which the coating is dried at a temperature is from 60°–100° C.

7. A method of enhancing the recording sensitivity jitter of an optical recording medium of the compact disc player single plate type which is playable on commercially available compact disc players, which comprises the steps of applying a recording layer containing a dye onto a substrate, applying a reflective layer over the recording layer and applying a protective layer over the reflecting layer, wherein the dye is a phthalocyanine dye which is applied as a coating to the substrate as a solution in a solvent having a solubility parameter of 8.5 or more and the coating thereafter dried and wherein prior to applying the reflective layer to the recording layer, the solvent content of the recording layer is reduced to 5 weight percent or less.

8. The process according to claim 7 wherein the solvent is a saturated or unsaturated aliphatic or alicyclic hydrocarbon or a linear ether and has a solution point of 180° C. or less.

9. The process according to claim 7 wherein the solvent is removed form the recording layer under conditions of temperature (T in ° C.) and time (t in hours) such that $T \times t^{\frac{1}{2}} = 50$ or more.

10. The process according to claim 9 wherein $T \times t^{\frac{1}{2}} 100$ or more.

11. The process according to claim 7 wherein the concentration of the dye in the solvent is 0.5–7% by weight.

12. The process according to claim 7 wherein the solvent is a saturated or unsaturated aliphatic or alicyclic hydrocarbon or a linear ether and has a boiling point of 180° C. or less; wherein the concentration of the dye in the solvent is 0.5–7% by weight; wherein the solvent is removed at a temperature of 60°–100° C. under conditions of temperature (T in ° C.) and time (t in hours) such that $T \times t^{\frac{1}{2}} = 50$ or more.

13. The process according to claim 12 wherein $T \times t^{\frac{1}{2}} = 100$ or more.

14. The process according to claim 8 wherein the solvent is removed form the recording layer at a temperature of 60°–100° C.

* * * * *